United States Patent
Kato et al.

(10) Patent No.: US 8,615,135 B2
(45) Date of Patent: Dec. 24, 2013

(54) FEATURE POINT POSITIONING APPARATUS, IMAGE RECOGNITION APPARATUS, PROCESSING METHOD THEREOF AND COMPUTER-READABLE STORAGE MEDIUM

(75) Inventors: Masami Kato, Sagamihara (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/899,387

(22) Filed: Oct. 6, 2010

(65) Prior Publication Data

US 2011/0091115 A1    Apr. 21, 2011

(30) Foreign Application Priority Data

Oct. 19, 2009   (JP) ................................. 2009-240877

(51) Int. Cl.
*G06K 9/46* (2006.01)
(52) U.S. Cl.
USPC ......................................................... 382/201
(58) Field of Classification Search
None
See application file for complete search history.

(56) References Cited

U.S. PATENT DOCUMENTS

| 5,508,823 | A  | 4/1996  | Kiyohara et al. |
| 7,039,233 | B2 | 5/2006  | Mori et al. |
| 7,577,297 | B2 | 8/2009  | Mori et al. |
| 7,699,423 | B2 | 4/2010  | Suwa et al. |
| 2006/0074653 | A1 | 4/2006 | Mitari et al. |
| 2006/0115157 | A1 | 6/2006 | Mori et al. |
| 2006/0228005 | A1 | 10/2006 | Matsugu et al. |
| 2007/0242856 | A1 | 10/2007 | Suzuki et al. |
| 2009/0080716 | A1 | 3/2009 | Yanagi |
| 2009/0089235 | A1 | 4/2009 | Torii et al. |
| 2009/0157707 | A1 | 6/2009 | Ito et al. |
| 2009/0220156 | A1* | 9/2009 | Ito et al. ........................ 382/201 |
| 2009/0220157 | A1* | 9/2009 | Kato et al. .................... 382/201 |
| 2010/0180189 | A1 | 7/2010 | Ito et al. |
| 2010/0209010 | A1 | 8/2010 | Kato et al. |

FOREIGN PATENT DOCUMENTS

JP       2009075999 A      4/2009

OTHER PUBLICATIONS

G.M. Beumer, et al., "A landmark paper in face recognition", Proceedings of the 7th International Conference on Automatic Face and Gesture Recognition, pp. 73-78, 2006.
U.S. Appl. No. 12/819,003, filed Jun. 18, 2010. Applicant: Yusuke Mitarai, et al.
U.S. Appl. No. 12/901,364, filed Oct. 8, 2010. Applicant: Yoshinori Ito, et al.

(Continued)

*Primary Examiner* — Stephen R Koziol
*Assistant Examiner* — Delomia Gilliard
(74) *Attorney, Agent, or Firm* — Fitzpatrick, Cella, Harper & Scinto

(57) ABSTRACT

A feature point positioning apparatus positions a plurality of feature points for a predetermined pattern in image data. The apparatus selectively executes first candidate decision processing which decides position candidates of the feature points and second candidate decision processing which decides position candidates of the feature points at a higher processing speed than the first candidate decision processing in accordance with an operation mode, and executes, when the operation mode is a high-speed mode in which an operation is executed at a higher speed than a normal mode, the second candidate decision processing for more feature points than in the normal mode; and corrects the position candidates of the plurality of feature points obtained by the first candidate decision processing and the second candidate decision processing based on a layout relationship among the plurality of feature points.

10 Claims, 13 Drawing Sheets

(56) References Cited

OTHER PUBLICATIONS

U.S. Appl. No. 12/873,159, filed Aug. 31, 2010. Applicant: Yoshinori Ito, et al.

U.S. Appl. No. 12/974,633, filed Dec. 21, 2010. Applicant: Masami Kato, et al.

U.S. Appl. No. 12/966,725, filed Dec. 13, 2010. Applicant: Takahisa Yamamoto, et al.

U.S. Appl. No. 12/970,712, filed Dec. 16, 2010. Applicant: Takashi Suzuki, et al.

* cited by examiner

FIG. 7

| FEATURE POINT NUMBER | NORMAL MODE TABLE | TRACKING MODE TABLE |
|---|---|---|
| 401 | 1 | 1 |
| 402 | 1 | 1 |
| 403 | 1 | 2 |
| 404 | 1 | 2 |
| 405 | 1 | 1 |
| 406 | 1 | 1 |
| 407 | 1 | 2 |
| 408 | 1 | 2 |
| 409 | 1 | 2 |
| 410 | 1 | 2 |
| 411 | 1 | 2 |
| 412 | 1 | 1 |
| 413 | 1 | 2 |
| 414 | 1 | 2 |
| 415 | 1 | 1 |

F I G. 11

| FEATURE POINT NUMBER | FACE RECOGNITION MODE TABLE | CLOSED EYE RECOGNITION MODE TABLE | SMILE RECOGNITION MODE TABLE |
|---|---|---|---|
| 401 | 1 | 1 | 2 |
| 402 | 1 | 1 | 2 |
| 403 | 1 | 1 | 1 |
| 404 | 1 | 1 | 1 |
| 405 | 1 | 1 | 2 |
| 406 | 1 | 1 | 2 |
| 407 | 1 | 1 | 1 |
| 408 | 1 | 1 | 1 |
| 409 | 1 | 2 | 2 |
| 410 | 1 | 2 | 2 |
| 411 | 1 | 2 | 2 |
| 412 | 1 | 2 | 1 |
| 413 | 1 | 2 | 1 |
| 414 | 1 | 2 | 1 |
| 415 | 1 | 2 | 1 |

FIG. 13

| FEATURE POINT NUMBER | NORMAL MODE TABLE | TRACKING MODE TABLE (FRONT) | TRACKING MODE TABLE (RIGHT) | TRACKING MODE TABLE (LEFT) |
|---|---|---|---|---|
| 401 | 1 | 1 | | 1 |
| 402 | 1 | 1 | 1 | 1 |
| 403 | 1 | 2 | 2 | 1 |
| 404 | 1 | 2 | 2 | 1 |
| 405 | 1 | 1 | 1 | 1 |
| 406 | 1 | 1 | 1 | 2 |
| 407 | 1 | 2 | 1 | 2 |
| 408 | 1 | 2 | 1 | 2 |
| 409 | 1 | 2 | 2 | 2 |
| 410 | 1 | 2 | 2 | 2 |
| 411 | 1 | 1 | 2 | 1 |
| 412 | 1 | 2 | 1 | 2 |
| 413 | 1 | 2 | 2 | 2 |
| 414 | 1 | | 2 | 2 |
| 415 | 1 | 1 | 2 | 2 |

F I G. 14
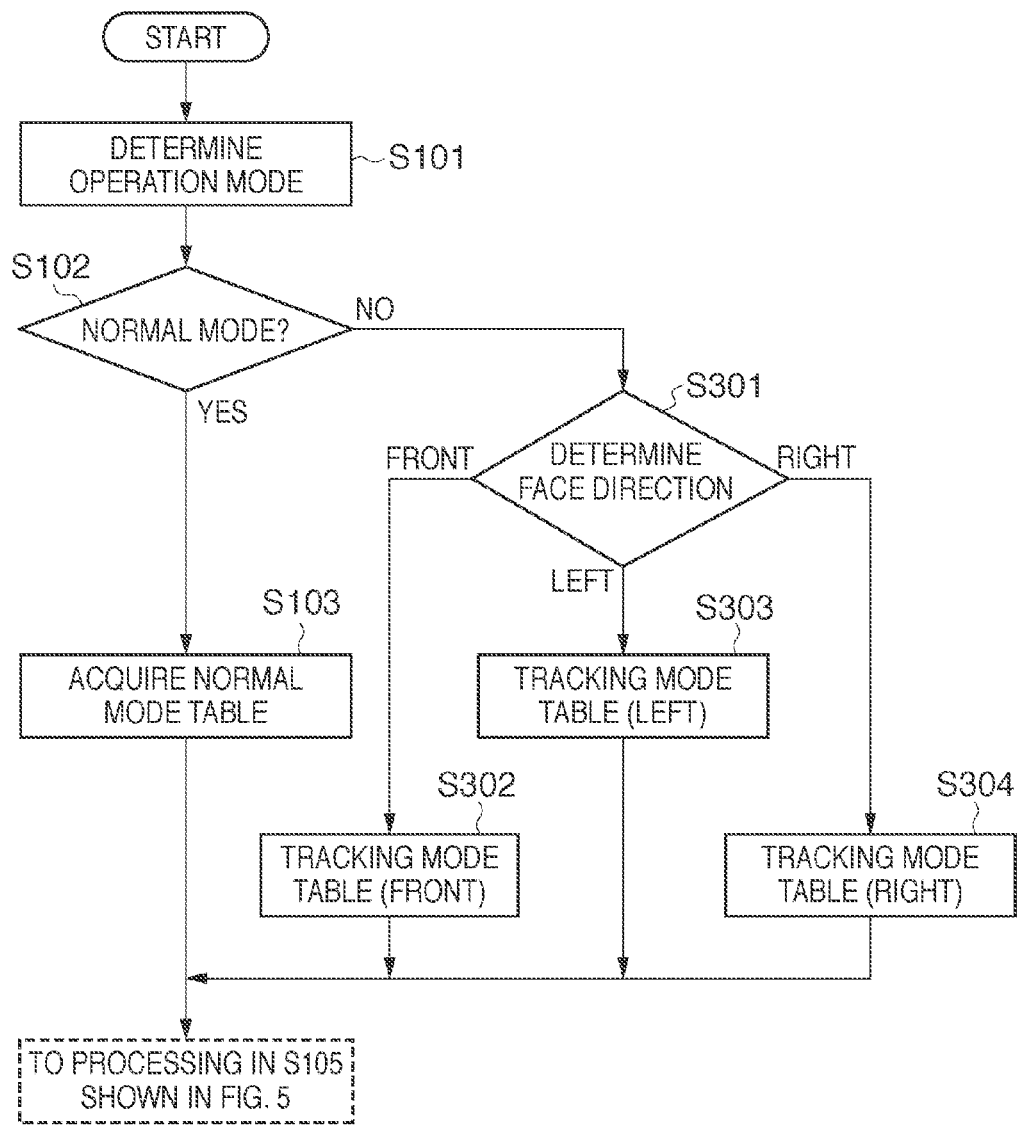

FEATURE POINT POSITIONING APPARATUS, IMAGE RECOGNITION APPARATUS, PROCESSING METHOD THEREOF AND COMPUTER-READABLE STORAGE MEDIUM

BACKGROUND OF THE INVENTION

1. Field of the Invention

The present invention relates to a feature point positioning apparatus, image recognition apparatus, processing method thereof and computer-readable storage medium.

2. Description of the Related Art

A technique for recognizing a predetermined pattern from image data (for example, face recognition) is known. In such recognition processing, position decisions of face organs or feature portions associated with them (to be referred to as feature points hereinafter) are important tasks, and often limit a recognition performance.

The high-precision position decisions of feature points require a heavy processing load, and often limit the time required for the overall recognition processing. Japanese Patent Laid-Open No. 2009-75999 (to be referred to as Reference 1) discloses a method of reducing the number of feature points to be extracted from a frame to be processed using the recognition result of the previous frame when an individual is to be recognized from moving image data. That is, once a target person has been recognized (tracking state), the number of feature points to be extracted in the next frame is reduced, thus speeding up the processing. On the other hand, [Beumer, G. M.; Tao, Q.; Bazen, A. M.; Veldhuis, R. N. J. "A landmark paper in face recognition" Automatic Face and Gesture Recognition, 2006. FGR 2006. 7th International Conference, pp. 73-78 (to be referred to as Reference 2 hereinafter)] discloses a method of deciding a plurality of face organ feature positions according to geometrical restrictions.

Since the method disclosed in Reference 1 reduces the number of feature points, a recognition performance drop is considerable. Upon reducing feature points, a load is imposed on recognition processing to be executed using the reduced feature points. For example, in the recognition processing, a plurality of recognition processing methods and parameters (various processing parameters, registered data, etc. used in recognition) have to be prepared, and an arbitrary method and parameters have to be selected from them. For this reason, as a result of replacing and selecting parameters, a processing time and memory resources required for processing increase.

With the method disclosed in Reference 2, the positions of feature points are corrected using a subspace. However, when the number of target feature points is changed, subspaces have to be prepared in correspondence with the numbers of feature points.

SUMMARY OF THE INVENTION

The present invention provides a technique which can suppress a precision drop even when positioning of feature points is executed at high speed.

According to a first aspect of the present invention, there is provided a feature point positioning apparatus which positions a plurality of feature points for a predetermined pattern in image data, comprising: a first candidate decision unit configured to execute first candidate decision processing to decide position candidates of the feature points; a second candidate decision unit configured to execute second candidate decision processing having a higher processing speed than the first candidate decision processing to decide position candidates of the feature points; a control unit configured to control the first candidate decision unit and the second candidate decision unit to selectively execute the first candidate decision processing and the second candidate decision processing for the respective feature points in accordance with an operation mode; and a correction unit configured to correct the position candidates of the plurality of feature points obtained by the first candidate decision processing and the second candidate decision processing based on a layout relationship among the plurality of feature points, wherein when the operation mode is a high-speed mode in which an operation is executed at a higher speed than a normal mode, the control unit controls to execute the second candidate decision processing for more feature points than in the normal mode.

According to a second aspect of the present invention, there is provided an image recognition apparatus for recognizing the predetermined pattern in the image data based on the positions of the plurality of feature points decided by the above-described feature point positioning apparatus According to a third aspect of the present invention, there is provided a processing method of a feature point positioning apparatus which positions a plurality of feature points for a predetermined pattern in image data, comprising the steps of: selectively executing first candidate decision processing which decides position candidates of the feature points and second candidate decision processing which decides position candidates of the feature points at a higher processing speed than the first candidate decision processing in accordance with an operation mode, and executing, when the operation mode is a high-speed mode in which an operation is executed at a higher speed than a normal mode, the second candidate decision processing for more feature points than in the normal mode; and correcting the position candidates of the plurality of feature points obtained by the first candidate decision processing and the second candidate decision processing based on a layout relationship among the plurality of feature points.

According to a fourth aspect of the present invention, there is provided a computer-readable storage medium storing a computer program for controlling a computer incorporated in a feature point positioning apparatus, which positions a plurality of feature points for a predetermined pattern in image data, to function as: a first candidate decision unit configured to execute first candidate decision processing to decide position candidates of the feature points; a second candidate decision unit configured to execute second candidate decision processing having a higher processing speed than the first candidate decision processing to decide position candidates of the feature points; a control unit configured to control the first candidate decision unit and the second candidate decision unit to selectively execute the first candidate decision processing and the second candidate decision processing for the respective feature points in accordance with an operation mode, and to execute, when the operation mode is a high-speed mode in which an operation is executed at a higher speed than a normal mode, the second candidate decision processing for more feature points than in the normal mode; and a correction unit configured to correct the position candidates of the plurality of feature points obtained by the first candidate decision processing and the second candidate decision processing based on a layout relationship among the plurality of feature points.

Further features of the present invention will be apparent from the following description of exemplary embodiments with reference to the attached drawings.

BRIEF DESCRIPTION OF THE DRAWINGS

FIG. 7 shows an example of operation information tables;

FIG. 11 shows an example of operation information tables according to the second embodiment;

FIG. 13 shows an example of operation information tables according to the third embodiment; and FIG. 14 is a flowchart showing an example of the operation of an image recognition apparatus 10 according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
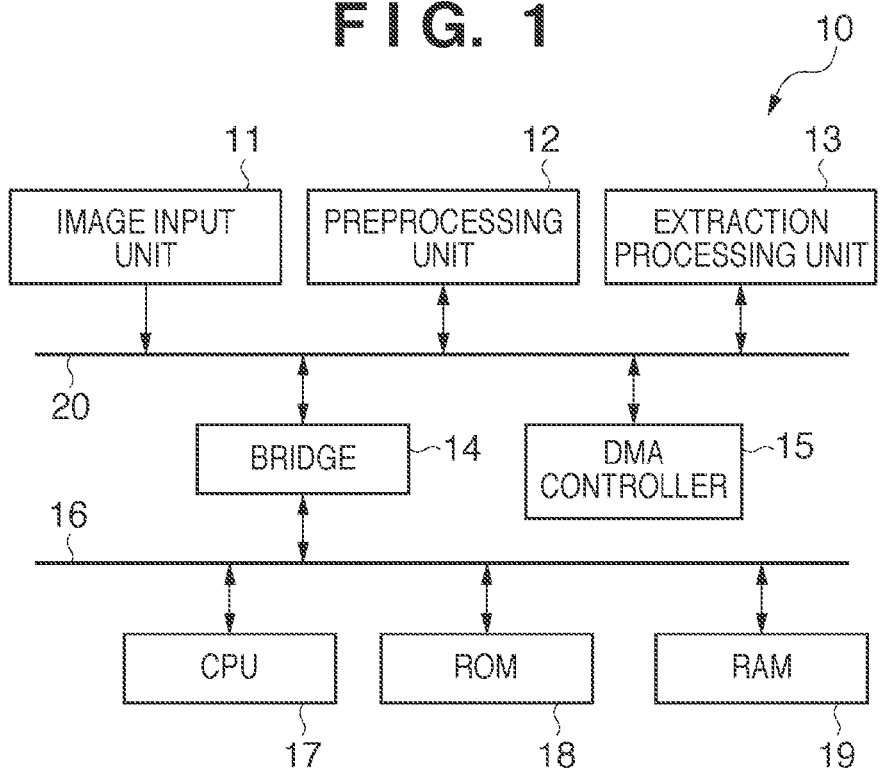
FIG. 1 is a block diagram showing an example of the arrangement of an image recognition apparatus according to an embodiment of the present invention.

FIG. 1 is a block diagram showing an example of the arrangement of an image recognition apparatus 10 to which a feature point positioning apparatus according to an embodiment of the present invention is applied.

The image recognition apparatus 10 incorporates one or a plurality of computers. The image recognition apparatus 10 extracts a predetermined pattern (face image data in this embodiment) from image data. Then, the image recognition apparatus 10 decides positions of a plurality of feature points from the extracted face image data, and executes face recognition based on the decided positions of the feature points.

In this case, the image recognition apparatus 10 includes an image input unit 11, preprocessing unit 12, extraction processing unit 13, bridge 14, DMA controller 15, CPU 17, ROM 18, and RAM 19.

The image input unit 11 inputs image data into the apparatus. The image input unit 11 is implemented by, for example, a driver circuit for controlling an optical system device, photoelectric conversion device, and sensor, an AD converter, a signal processing circuit for controlling various kinds of image correction, and a frame buffer.

The preprocessing unit 12 applies preprocessing to image data input by the image input unit 11. The preprocessing includes, for example, color conversion processing and contrast correction processing. Note that the preprocessing is applied to effectively attain various kinds of subsequent processing. The preprocessing unit 12 may be implemented by either hardware or software.

Figure 2:
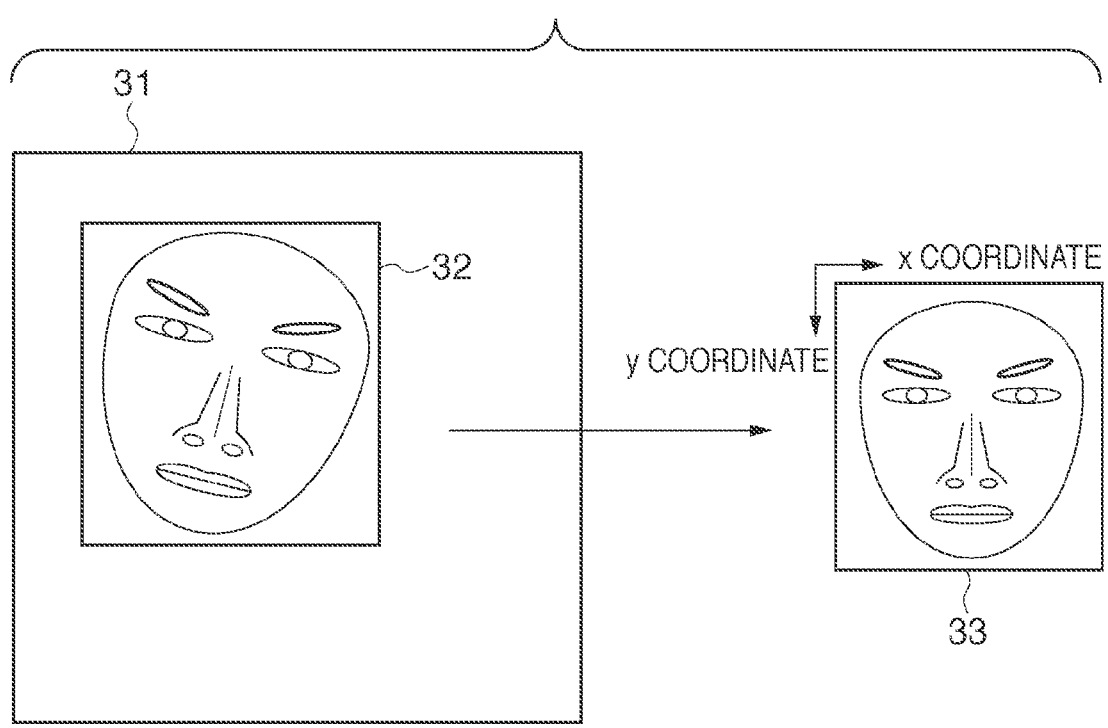
FIG. 2 is a view showing an example of processing for extracting a face image.

The extraction processing unit 13 applies face detection processing to image data, which is processed (corrected) by the preprocessing unit 12, and extracts face image data for each detected face by normalizing it to a predetermined size. Note that various face detection methods which have been conventionally proposed may be used. More specifically, as shown in FIG. 2, the extraction processing unit 13 detects a face region 32 from an image 31 processed by the preprocessing unit 12, and extracts a face image 33 by normalizing the face region 32 to a predetermined size. That is, the face image 33 has a constant size independently of faces. In the following description, positions of feature points will be explained as coordinates of those in the face 33. Coordinates in this case are expressed by a coordinate system (x and y coordinates) to have the upper left end of the face image 33 as an origin. Note that the extracted image is stored in the RAM (Random Access Memory) 19 via the DMA (Direct Memory Access) controller 15.

The CPU (Central Processing Unit) 17 systematically controls the operations in the image recognition apparatus 10. The CPU 17 executes recognition processing for, for example, the face image 33 stored in the RAM 19.

The bridge 14 is arranged between an image bus 20 and CPU bus 16 and provides a bus bridge function. The ROM (Read Only Memory) 18 stores control programs to be executed by the CPU 17. The RAM 19 is used as a work area of the CPU 17. The RAM 19 also stores information (for example, feature vectors indicating features) which indicates faces of persons registered as recognition targets. Note that the RAM 19 is configured by, for example, a relatively large-capacity memory such as a DRAM (Dynamic RAM), and is connected to the CPU bus 16 via a memory controller (not shown). Devices on the image bus 20 and CPU bus 16 operate simultaneously.

Figure 3:
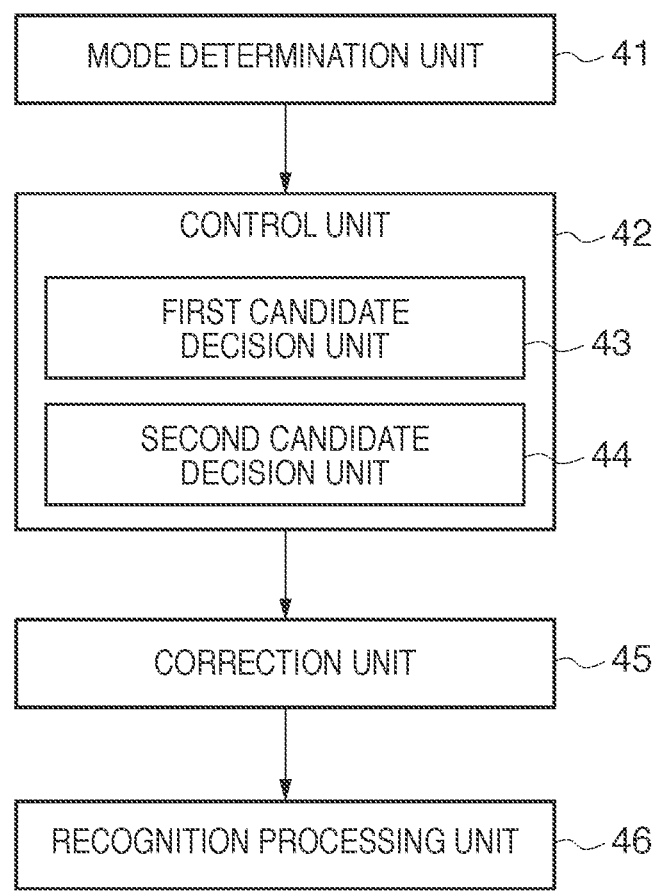
FIG. 3 is a block diagram showing an example of the functional arrangement implemented by a CPU 17 shown in FIG. 1.

FIG. 3 is a block diagram showing an example of the functional arrangement implemented by the CPU 17 shown in FIG. 1. Various processing functions implemented by the CPU 17 are mainly implemented when the CPU 17 executes control programs stored in the ROM 18.

Note that the CPU 17 includes, as functional components, a mode determination unit 41, control unit 42, correction unit 45, and recognition unit 46.

The mode determination unit 41 determines an operation mode. The operation mode according to the first embodiment includes a normal mode and tracking mode (high-speed mode). In the normal mode, face recognition is executed by stressing the recognition precision over the processing speed. In the tracking mode, although a precision drop to some extent is permitted, high-speed processing is executed. The mode determination is made based on whether or not a person to be recognized (a person who is registered as a recognition target) has been recognized in the previous frame. More specifically, the mode determination unit 41 determines the operation mode with reference to the recognition result of the previous frame stored in the RAM 19.

The control unit 42 controls execution of decision processing of position candidates of feature points. The control unit 42 includes a first candidate decision unit 43 and second candidate decision unit 44.

The first candidate decision unit 43 executes first candidate decision processing so as to decide position candidates of feature points. This processing uses, for example, CNN (Convolutional Neural Networks) calculations to decide position candidates of feature points with high precision. That is, the first candidate decision unit 43 decides position candidates of feature points using the method which can guarantee high precision although it requires a long processing time.

The second candidate decision unit 44 executes second candidate decision processing so as to decide position candidates of feature points. This processing decides position candidates of feature points at high speed using a method with a light processing load. This embodiment will explain a case in which average positions of feature points are calculated in advance, and are used as position candidates of feature points. The average positions of feature points may use average vector values used in, for example, geometric correction processing (to be described later). That is, the second candidate decision unit 44 decides candidates of coordinate values of corresponding feature points from an average vector, which is calculated in advance by learning.

Figure 4:
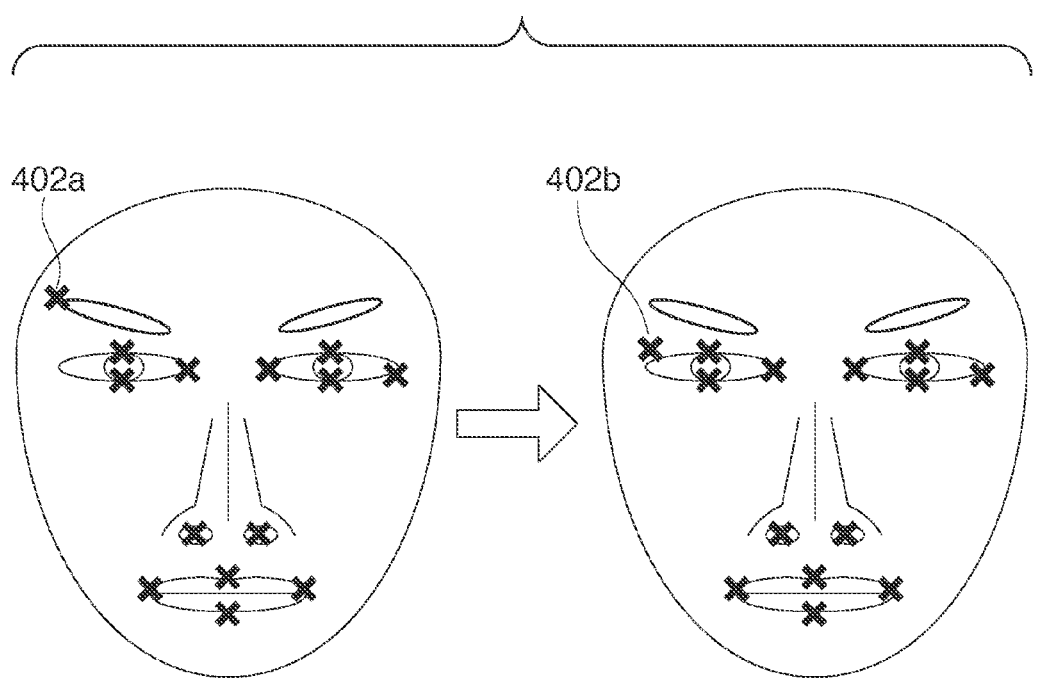
FIG. 4 is a view showing an example of correction processing of feature points.

The correction unit 45 applies correction processing to position candidates of feature points decided by the first and second candidate decision units 43 and 44. For example, assume that position candidates of feature points are decided, as shown in FIG. 4. In this case, a feature point 402a is that indicating a corner of an eye, but it is laid out at a position of an eyebrow end. The correction unit 45 corrects the feature point 402a to a position of a feature point 402b. Note that details of this correction processing will be described later, and the correction unit 45 corrects a position by statistical processing based on the layout relationship of features of human faces.

The recognition unit 46 executes recognition processing (face recognition in this embodiment) based on the corrected positions of feature points. Note that the method of the recognition processing is not particularly limited, since various methods which have been conventionally proposed may be applied as the recognition processing. For example, a plurality of local regions are extracted with reference to the decided positions of feature points, and undergo dimension reduction by, for example, orthogonal transformation. Then, dimension-reduced data are used as feature vectors. Likewise, a similarity to a registered person is calculated by correlation calculations with calculated feature vectors of the registered person. Note that the feature vectors of the registered person are stored in, for example, the RAM 19 prior to recognition. A plurality of feature vectors are calculated with reference to the positions of feature vectors. For example, feature vectors are calculated from a plurality of local regions including eyes, a nose, and a mouse. Then, correlation values of the plurality of calculated feature vectors are combined to calculate a final similarity. After the final similarity is calculated, it undergoes threshold processing, and whether or not to recognize the registered person is determined based on the processing result. In this way, the recognition processing can be attained.

The example of the functional arrangement implemented by the CPU 17 has been described. Note that the arrangement described above need not always be implemented by the CPU 17. For example, some or all of the components may be implemented in hardware.

An example of the operation of the image recognition apparatus 10 shown in FIGS. 1 and 2 will be described below with reference to FIG. 5. In this case, the operation upon execution of the feature point position decision processing and face recognition processing will be explained. Note that this processing is mainly executed by the CPU 17.

When this processing starts, the image recognition apparatus 10 determines the operation mode using the mode determination unit 41 (S101). As described above, whether the operation mode is the normal or tracking mode is determined.

Figure 6:
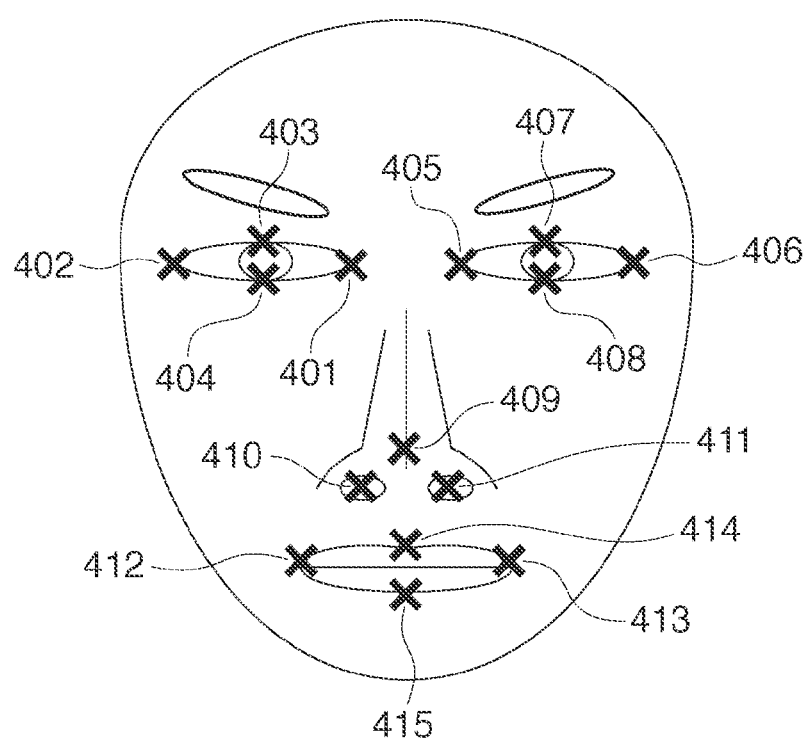
FIG. 6 is a view showing an example of feature points.

After the mode determination, the image recognition apparatus 10 acquires operation information based on the mode determination result using the control unit 42. More specifically, if the operation mode is the normal mode (YES in S102), the control unit 42 acquires operation information in the normal mode (normal mode table) (S103). On the other hand, if the operation mode is the tracking mode (NO in S102), the control unit 42 acquires operation information in the tracking mode (tracking mode table) (S104). That is, the control unit 42 acquires different operation information according to the operation mode. FIG. 6 shows an example of face organs and positions of feature points related to these face organs. The feature point position decision processing is executed to specify the positions of feature points 401 to 415 (15 feature points in this case) shown in FIG. 6. An operation information table (including the normal mode table and tracking mode table) shown in FIG. 7 prescribes for each feature point which of the first candidate decision processing and the second candidate decision processing is used to decide the position candidate of that feature point. "1" prescribed in the operation information table shown in FIG. 7 indicates that the first candidate decision processing by the first candidate decision unit 43 is to be executed, and "2" indicates that the second candidate decision processing by the second candidate decision unit 44 is to be executed.

After acquisition of the operation information, the image recognition apparatus 10 designates a feature point as a position decision target using the control unit 42 (S105). That is, the control unit 42 designates at least one of the feature points 401 to 415 as a position decision target. This designation is made based on, for example, information which is set in advance.

Next, the image recognition apparatus 10 decides a position candidate of each feature point. Note that this processing targets at the feature point decided in the processing in step S105. The candidate position of each feature point is decided using one of the first and second candidate decision units 43 and 44, as described above. Which of the first and second candidate decision units 43 and 44 is to be used follows the operation information prescribed in the operation information table. Upon decision of the position candidate of each feature point, processing to be executed upon deciding the position candidate of an n-th feature point is decided based on the operation information acquired in step S103 or S104 (S106). Then, according to this decision result, the first candidate decision processing (S108 after YES in S107) or the second candidate decision processing (S109 after NO in S107) is executed. That is, a position candidate is decided for each feature point using a different method according to the operation mode. For example, with reference to the table shown in FIG. 7, the first candidate decision processing by the first candidate decision unit 43 is executed for all feature points in the normal mode. In the tracking mode, different processes are executed for respective feature points. For example, the first candidate decision processing is executed for the feature points 401 and 402, and the second candidate decision processing is executed for the feature points 403 and 404. In this way, in the normal mode, the position candidates of all the feature points are decided with high precision. On the other hand, in the tracking mode, the position candidates of the feature points 401, 402, 405, 406, 412, and 415 are decided with high precision by the first candidate decision processing (for example, using the CNN calculations), and those of the remaining feature points are decided at high speed by the second candidate decision processing (for example, using average vectors). That is, in the tracking mode, the position candidates of only some feature points having a high degree of importance in the subsequent processes are calculated with high precision. Note that the information prescribed in the operation information table shown in FIG. 7 is decided in advance in consideration of the processing speed and performance.

After that, the image recognition apparatus 10 determines, using the control unit 42, whether or not the processes in steps S106 to S109 described above are executed for all the feature points as the position decision targets. If feature points whose position candidates are to be decided still remain (NO in S110), the control unit 42 executes the same processes for the next feature point (n=n+1) (S111). On the other hand, if all the feature points as the targets have been processed (YES in S110), the image recognition apparatus 10 stores the decided position candidates of the feature points in the RAM 19 using the control unit 42.

Next, the image recognition apparatus 10 applies, using the correction unit 45, geometric correction processing to the position candidates of the feature points (15 position candidates in this embodiment) obtained by the aforementioned processing. Then, final positions of the feature points are decided (S112).

After the final positions of the feature points are decided, the image recognition apparatus 10 applies, using the recognition unit 46, face recognition processing based on the final positions of the feature points (the corrected positions of the feature points) (S113), and stores the result in, for example, the RAM 19 (S114). After that, the image recognition apparatus 10 executes the aforementioned processing for the next frame. Note that the number and types of local regions used in the recognition processing in step S113 are the same irrespective of the operation mode. That is, in this embodiment, the same recognition processing is executed irrespective of the operation mode.

Figure 8:
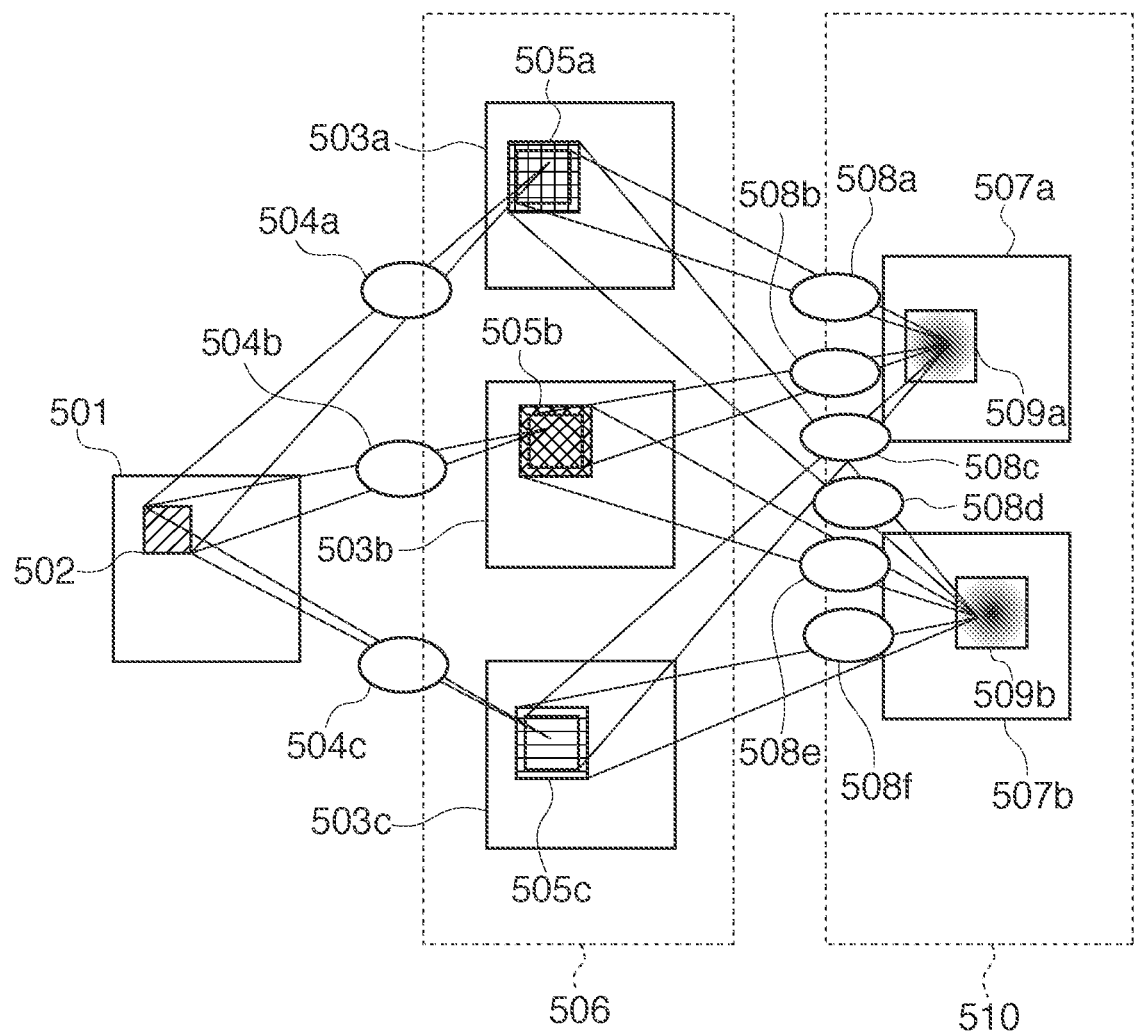
FIG. 8 is a view showing an overview of first candidate decision processing in step S108 shown in FIG. 5.

The first candidate decision processing in step S108 shown in FIG. 5 will be described below with reference to FIG. 8. The first candidate decision processing according to this embodiment uses the CNN calculations. To help easy understanding, a case will be exemplified below wherein position candidates of two feature points are to be decided.

The CNN calculations include hierarchical feature extraction processes. FIG. 8 shows an example of two-layer CNN calculations, the number of features of a first layer 506 is three, and the number of features of a second layer 510 is two. Reference numeral 501 denotes face image data, which corresponds to the face image 33 described using FIG. 2.

Reference numerals 503a to 503c denote feature planes of the first layer 506. The feature plane is an image data plane which stores a result obtained by scanning and calculating data of a previous layer by a feature extraction filter (cumulative sum processing of convolution calculations and non-linear processing). The feature plane is a detection result for raster-scanned image data. For this reason, that detection result is expressed by the plane.

The feature planes 503a to 503c are calculated using different feature extraction filters with reference to the face image data 501. The feature planes 503a to 503c are respectively generated by calculations of two-dimensional convolution filters 504a to 504c and non-linear conversions of the calculation results. Note that reference numeral 502 denotes a reference image region required for the convolution calculations. For example, convolution filter calculations having a filter size=11×11 (horizontal length×vertical height) use product-sum calculations given by:

$$\text{output}(x, y) = \sum_{row=-RowSize/2}^{rowSize/2} \sum_{column=-columnSize/2}^{columnSize/2} \text{input}(x + \text{column}, y + \text{row}) \times \text{weight}(\text{column}, \text{row}) \quad (1)$$

where input(x, y): a reference pixel value at coordinates (x, y),
output(x, y): a calculation result at the coordinates (x, y),
weight(column, row): a weighting coefficient at coordinates (x+column, y+row), and
columnSize=11, rowSize=11: a filter size (number of filter taps).

Reference numerals 504a to 504c denote convolution filters having different coefficients. The coefficients of the convolution filters are decided in advance by learning. Note that the convolution filters also have different sizes depending on the feature planes. In the CNN calculations, product-sum calculations are repeated while scanning a plurality of filters for respective pixels, and a final product-sum result is non-linearly converted. Thus, the feature plane is generated. The non-linear conversion may use, for example, a sigmoid function. For example, in case of calculations of the feature plane 503a, since the number of couplings with the previous layer is one, one convolution filter 504a is used.

On the other hand, in case of calculations of each of feature planes 507a and 507b, since the number of couplings with the previous layer is three, calculation results of three convolution filters 508a to 508c or 508d to 508e are cumulatively added. That is, one feature value in the feature plane 507a is obtained by cumulatively adding all outputs from the convolution filters 508a to 508c, and non-linearly converting the cumulative sum.

Reference numerals 505a to 505c denote reference image regions required for the convolution calculations 508. In general, the CNN calculation method is known as a powerful feature extraction method, but it requires a large number of product-sum calculations and a heavy processing load, as described above.

The first candidate decision processing calculates, as candidate coordinates of the positions of feature points, the barycenters of the feature planes 507a and 507b as the CNN calculation results. Note that actual processing may execute calculations for limited regions in consideration of a probability of existence of feature points in an image. Reference numerals 509a and 509b denote regions to be actually calculated of feature planes of two layers. In this way, calculations are made for the limited regions, and the barycenters of the calculation results are decided as candidates (coordinates) of the positions of feature points.

The first candidate decision processing has been described. In this example, the case has been explained wherein two feature points are extracted. However, the present invention is not limited to this. In this embodiment, a network which can decide the position candidates of the 15 feature points is configured. In this case, the number of features of the second layer is 15. According to the results of the processes in steps S105 and S106, only required feature planes of the second layer are extracted to decide the position candidates of the feature points.

Figure 9:
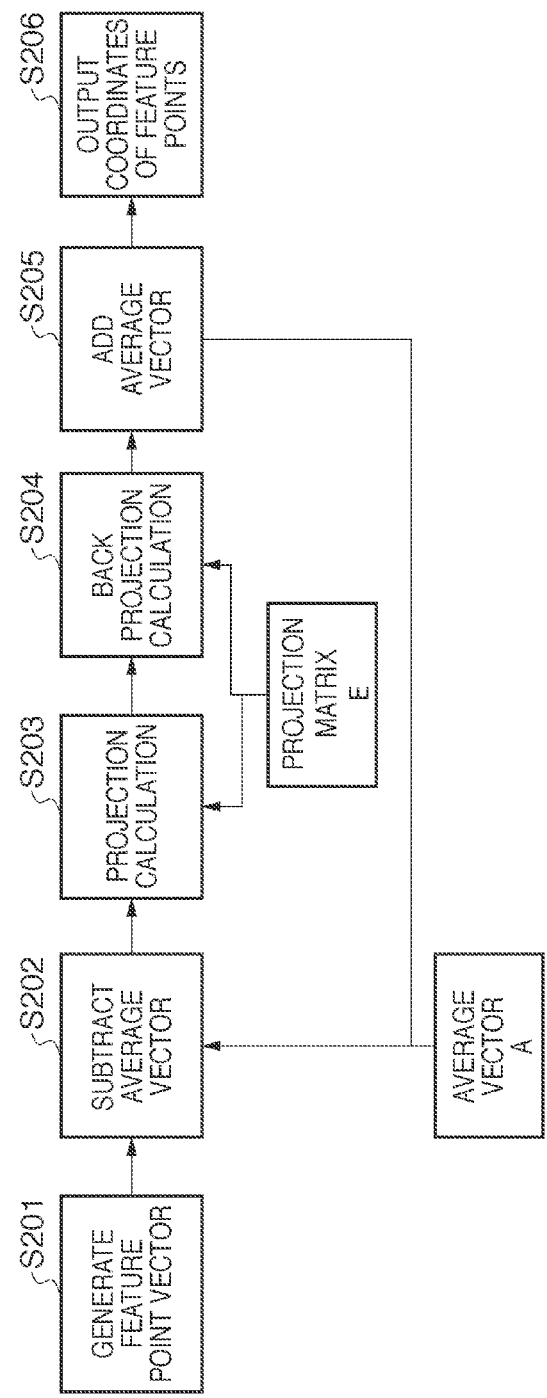
FIG. 9 is a chart showing an overview of correction processing in step S112 shown in FIG. 5.

The correction processing in step S112 shown in FIG. 5 will be described below with reference to FIG. 9.

When the correction processing starts, the correction unit 45 simply couples the coordinates of the position candidates of the respective feature points. Then, one vector data is generated (S201). In this embodiment, a 30-dimensional feature point vector V is generated from the coordinates of the position candidates of the 15 feature points. A data sequence obtained by simply coupling position coordinate data $(x_i, y_i)$ [i: a number=1 to 15 of a feature point] of the respective feature points is generated as the feature point vector V (element $v_j$: j=1 to 30). The numbers=1 to 15 of the feature points correspond to the feature points 401 to 415 shown in FIG. 6. Therefore, elements $v_1$ and $v_2$ of the feature point vector respectively correspond to x- and y-coordinate values of the feature point 401. The feature point vector V is defined by:

$$V = (v_1, v_2, v_3, \ldots, v_{2 \times f})^T \qquad (2)$$

where T: transposition, and
f: the number of feature points.

Next, the correction unit 45 executes an average vector subtraction (S202) and projection calculation (S203). These calculation processes use an average vector A and projection matrix E to calculate a projection vector P. The projection vector P is calculated using a vector obtained by subtracting the average vector A from the feature point vector V, and the projection matrix E by:

$$P = E^T(V-A) \qquad (3)$$

Note that the projection matrix E and average vector A are calculated in advance using feature point vectors (learning feature vectors) for a large number of face images by principal component analysis. For this reason, the projection matrix E in this case is configured by eigenvectors. Likewise, each learning feature vector is configured by a vector generated by coupling correct coordinates of positions of feature points of a face image.

$$A = (a_1, a_2, a_3, \ldots, a_{2 \times f}) \qquad (4)$$

$$E = (u_1, u_2, \ldots, u_p) \qquad (5)$$

where u1, u2, . . . , up are respectively (2×f)-dimensional orthonormal vectors (eigenvectors) obtained by the principal component analysis. In this embodiment, 30-dimensional vectors are used. Also, p indicates dimensions of the projection vector (8 in this embodiment). That is, a matrix obtained by selecting eight vectors having large corresponding eigenvalues of the orthonormal vectors obtained by the principal component analysis is the projection matrix E. Note that the projection matrix E and average vector A are calculated in advance and are stored in, for example, the ROM 18 or RAM 19. In the processes in steps S202 and S203, the (2×f)-dimensional feature point vectors are dimension-reduced to the p-dimensional projection vectors by the calculation given by equation (3). That is, the (2×f)-dimensional feature point vectors are projected onto a subspace of predetermined dimensions (i.e., p dimensions).

After that, the correction unit 45 restores the original feature point vector (i.e., coordinate positions) from the projection vector P (S204, S205). A restored vector V' is calculated by:

$$V' = EP + A \qquad (6)$$

That is, the average vector A is added to the aforementioned projection matrix E.

Next, the correction unit 45 executes feature point coordinate output processing (S206) to extract corrected coordinate data from the back-projected restored vector V'. In this way, the position data of all the feature points are coupled to obtain a vector, which undergoes a dimension reduction and is then projected onto a subspace. After that, the vector is back-projected. In this way, statistical outliers can be corrected (see Reference 2). That is, the outliers (detection errors) which cannot be expressed by the projected subspace can be corrected. Then, the geometric layout relationship can be corrected based on that of the feature points. For this reason, detection errors described using FIG. 4 can be corrected.

Note that the second candidate decision processing according to this embodiment designates elements of the average vector A corresponding to the feature points as the position candidates of the feature points, as described above. For example, when the second candidate decision processing processes the feature point 403, elements $(a_5, a_6)$ of the average vector A are designated as the coordinates of a candidate. Elements of the feature vector corresponding to a feature point (having the average vector elements as a candidate) assume "0" by the processing in step S202. For this reason, the calculations (S203) for projection with respect to those elements can be omitted.

That is, since the number of multiplications in the projection calculations in step S203 can be reduced, the processing can be further speeded up. Note that this processing may be replaced by processing for setting elements corresponding to the eigenvectors E (elements corresponding to a target feature point position) to be "0" in place of selecting elements of the average vector A in the second candidate decision processing in step S109 shown in FIG. 5.

As described above, according to the first embodiment, the position candidate of each feature point is decided using one of the first and second candidate decision processes having different processing speeds for each operation mode and feature point. Then, the geometric correction processing is applied to the position candidate using the common method independently of the operation mode. For this reason, for example, when the tracking mode is set and positioning of the feature points has to be executed at high speed, a position precision drop of the decided feature points can be suppressed.

Since the number of feature points is not increased/decreased depending on the operation mode, recognition processing need not be switched according to the operation mode. In this way, since the need for processing for replacing recognition processing parameters and registered vector data upon changing of the operation mode can be obviated, memory resources can be reduced.

Second Embodiment

The second embodiment will be described below. The first embodiment has explained the case in which the tracking mode and normal mode are available as the operation modes. The second embodiment will explain a case in which other operation modes are provided. Note that the functional arrangement of an image recognition apparatus 10 according to the second embodiment is the same as that shown in FIG. 1, and a description thereof will not be repeated. In this embodiment, differences from the operations of the first embodiment will be explained.

Figure 10A:
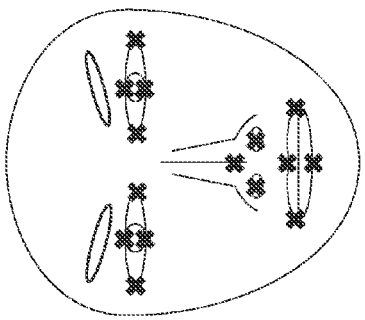
FIGS. 10A to 10C are views showing an example of feature points according to the second embodiment.
Figure 10B:
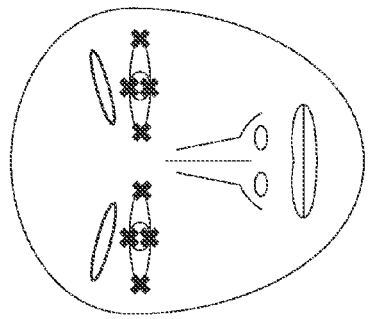
Figure 10C:
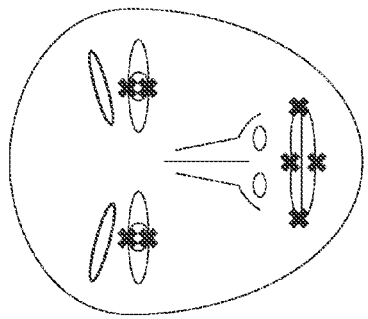

In the second embodiment, three operation modes, that is, a face recognition mode, closed eye recognition mode, and smile recognition mode are provided. In the closed eye recognition mode, it is detected whether or not a subject's eyes are open or closed. In the smile recognition mode, a facial expression is recognized. FIG. 10A shows an example of feature points in the face recognition mode, FIG. 10B shows an example of feature points in the closed eye recognition mode, and FIG. 10C shows an example of feature points in the smile recognition mode. When one of these modes is set, a face, closed eyes, smile, or the like is identified and recognized from the positions of the feature points and feature amounts based on luminance values around these positions.

Figure 5:
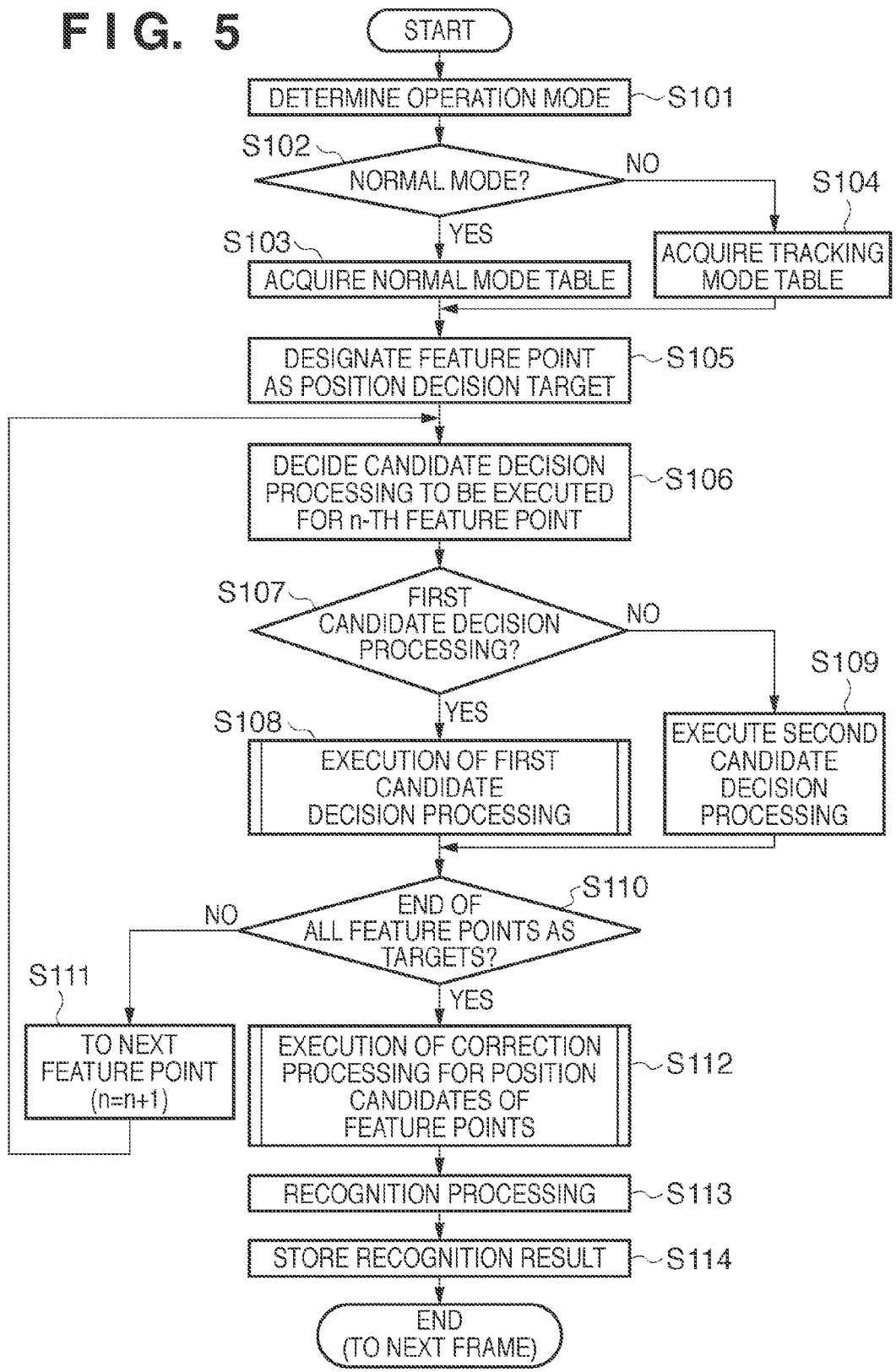
FIG. 5 is a flowchart showing an example of the operation of an image recognition apparatus 10 shown in FIGS. 1 and 2.

In this case, as an operation difference from the first embodiment, the aforementioned three operation modes are determined in step S101 shown in FIG. 5. The operation modes can be determined based on, for example, a user's designation via a predetermined user interface.

In steps S103 and S104 shown in FIG. 5, an operation information table shown in FIG. 11 is acquired according the operation mode. Note that as in the first embodiment, "1" prescribed in the operation information tables shown in FIG. 11 indicates that first candidate decision processing by a first candidate decision unit 43 is to be executed. "2" indicates that second candidate decision processing by a second candidate decision unit 44 is to be executed. Also, "1'" indicates that processing for deciding a position candidate of a feature point with higher precision than the first candidate decision processing by the first candidate decision unit 43 is to be executed. This processing may be executed by arbitrary methods. For example, a CNN calculation range may be set to be broader than that at the time of the first candidate decision processing. Note that this processing may be executed by the first candidate decision unit 43 or executed by arranging another new arrangement (third candidate decision processing).

In step S105 shown in FIG. 5, processing to be executed when a position candidate of a feature point is to be decided is decided based on the acquired operation information. More specifically, in the face recognition mode, all feature points shown in FIG. 10A are processed with high precision by the first candidate decision processing "1". In the closed eye recognition mode, feature points related to eyes in FIG. 10B are processed by third candidate decision processing "1'" with the highest precision, and other feature points are processed by the second candidate decision processing at high speed. In the smile recognition mode, feature points related to eyes and a mouth shown in FIG. 10C are processed by the third candidate decision processing "1'" with the highest precision, and other feature points are processed by the second candidate decision processing at high speed. In step S113 shown in FIG. 5, recognition processing as one of face recognition, closed eye recognition, and smile recognition is executed according to the operation mode.

As described above, according to the second embodiment, the processing with the highest precision is assigned to decision of the position candidates of important feature points according to the operation mode, and the high-speed processing is assigned to decision of the position candidates of other feature points. In this way, a given precision can be maintained without increasing a total processing time. That is, by selectively executing position candidate decision processes for respective feature points, a tradeoff between the processing time and the processing precision according to the operation mode can be easily attained. As in the first embodiment, independently of the operation modes, detection errors of feature points can be corrected using common geometric correction processing.

Third Embodiment

The third embodiment will be described below. The third embodiment will explain a case in which candidate decision processing is selectively executed according to a state (direction) of a predetermined pattern (face). Note that the functional arrangement of an image recognition apparatus 10 according to the third embodiment is the same as that shown in FIG. 1, and a description thereof will not be repeated. In this embodiment, differences from the operations of the first embodiment will be explained.

Figure 12:
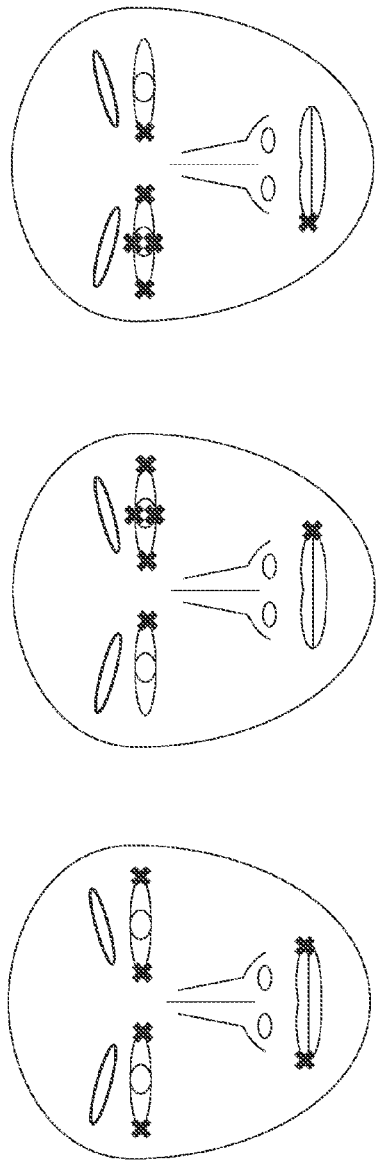
FIGS. 12A to 12C are views showing an example of feature points according to the third embodiment.

FIGS. 12A to 12C show examples of feature points required to decide position candidates of feature points with high precision in a tracking mode. FIG. 12A shows an example of feature points when a person (face) faces front. FIG. 12B shows an example of feature points when a person faces to the right. FIG. 12C shows an example of feature points when a person faces to the left. In the third embodiment, even when the direction of the face changes, features of a region which can be observed well are determined with high precision. FIG. 13 shows operation information tables in this case.

Differences from the operations in the first embodiment will be described below with reference to FIG. 14. Note that the same step numbers in FIG. 14 denote the same processes as those in FIG. 5 used to explain the first embodiment.

In the third embodiment, processes for determining directions of a face are newly added (S301 to S304). For this reason, a control unit 42 includes a state determination unit (not shown) which determines a direction of a face. Note that various methods which have been conventionally proposed may be applied to the face direction determination, and the method is not particularly limited. As a result, if the operation mode is the tracking mode (NO in S102), the direction of a face is determined. If the direction is a front direction ("front" in S301), a tracking mode table (front) is acquired (S302). If the direction is a left direction ("left" in S301), a tracking mode table (left) is acquired (S303). If the direction is a right direction ("right" in S301), a tracking mode table (right) is acquired (S304). In this way, in step S105, different operation information is acquired also according to the direction of a face in the tracking mode in addition to the first embodiment.

As described above, according to the third embodiment, in the tracking mode, feature point position candidate decision processing is selectively executed also according to the direction of a face. More specifically, high-precision processing is executed for feature points whose position candidates are likely to be decided with high precision, and high-speed processing is executed for other feature points. In this manner, even when the number of feature points whose candidates are likely to be decided with high precision is small, a performance drop can be suppressed. Furthermore, since the high-precision processing is executed to decide the positions of feature points whose candidates are likely to be decided with high precision, the recognition processing performance can be improved.

The representative embodiments of the present invention have been described. However, the present invention is not limited to the aforementioned and illustrated embodiments, and may be appropriately modified without departing from the scope of the invention.

For example, the aforementioned first to third embodiments have exemplified the case in which the operation mode (normal mode/tracking mode) is determined according to the recognition result of the previous frame. However, the present invention is not limited to this. For example, the mode may be determined based on the number of faces in the target image 31, or it may be determined according to a user's input operation via a user interface. Note that when the mode is determined according to the user's input operation via the user interface, the operation mode may be determined based on input information.

The aforementioned first to third embodiments have exemplified the case in which the average vector is used as the second candidate decision processing. However, the present invention is not limited to this. The second candidate decision processing can be a method which satisfies at least one of a higher processing speed or a lighter processing load (i.e., a smaller calculation amount) than the first candidate decision processing. For example, feature points as candidates may be decided by simple template matching. In this case, a plurality of templates corresponding to the positions of feature points to be extracted are generated by learning. Then, upon execution of the second candidate decision processing, correlation values are calculated while scanning the template around the feature point to be extracted, and a position corresponding to a maximum correlation value is extracted as the position candidate of that feature point. In this way, a performance drop in the high-speed mode (e.g., the tracking mode) can be reduced more, and the processing time can also be shortened.

The aforementioned first to third embodiments have exemplified the case in which the first and second candidate decision processes are executed using different methods. However, the present invention is not limited to this. For example, both the first and second candidate decision processes may decide position candidates of feature points by CNN calculations. In this case, different CNN calculation ranges (search ranges of position candidates of feature points) may be set to adjust the processing speeds in the first and second candidate decision processes. More specifically, in the CNN calculations in the second candidate decision processing, the calculation target regions 509a and 509b are limited to ranges narrower than the CNN calculations in the first candidate decision processing (see FIG. 8). In this manner, a processing load on the second candidate decision processing can be reduced, thus speeding up the processing.

The aforementioned first to third embodiments have exemplified the case in which a specific person is recognized from a face image (or a state of a person is recognized). However, the present invention is not limited to this. For example, a predetermined object may be recognized or detected based on a layout of feature points. Furthermore, the image recognition apparatus has been exemplified. However, the present invention is not limited to this. For example, an image processing apparatus, which corrects or modifies an image using the decided coordinates of feature points, may be provided.

The prescribed contents of the operation information tables described in the aforementioned first to third embodiments are presented only for an exemplary purpose, and they may be appropriately changed in consideration of the processing speeds and performances. For example, in the second embodiment, operation information indicating that the third candidate decision processing with a higher precision than the first candidate decision processing is to be executed is set. However, the third candidate decision processing need not always be executed, and for example, the first candidate decision processing may be executed.

The aforementioned third embodiment has exemplified the case in which the operation information at the time of the feature point position candidate decision processing is switched according to the direction of a face. However, the present invention is not limited to this. For example, operation information tables corresponding to other conditions may be prepared. For example, illumination conditions as states of an image (predetermined pattern) may be determined.

The present invention can adopt embodiments in the forms of, for example, a system, apparatus, method, program, or storage medium. More specifically, the present invention may be applied to either a system including a plurality of devices or an apparatus including a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240877 filed on Oct. 19, 2009, which is hereby incorporated by reference herein in its entirety.

What is claimed is:

1. A feature point positioning apparatus which positions a plurality of feature points for a predetermined pattern in image data, comprising:
   a first candidate decision unit configured to execute first candidate decision processing to decide position candidates of the feature points;
   a second candidate decision unit configured to execute second candidate decision processing having a higher processing speed than the first candidate decision processing to decide position candidates of the feature points;
   a mode determination unit configured to determine an operation mode which is selected from a plurality of operation modes including a normal mode and a high-speed mode in which an operation is executed at a higher speed than the normal mode;
   a control unit configured to select and control to execute one of the first candidate decision processing and the second candidate decision processing for each of a plurality of feature points in accordance with the operation mode determined by the mode determination unit; and
   a correction unit configured to correct the position candidates of the plurality of feature points obtained by the first candidate decision processing or the second candidate decision processing based on a layout relationship among the plurality of feature points in any operation mode,
   wherein in the high-speed mode, said control unit selects and controls to execute the second candidate decision processing for more feature points than in the normal mode.

2. The apparatus according to claim 1, wherein the second candidate decision processing requires a smaller calculation amount than the first candidate decision processing.

3. The apparatus according to claim 1, wherein in the first candidate decision processing and the second candidate decision processing, the position candidates of the feature points are decided by searching a range in the image data, and the range of search for the second candidate decision processing is narrower than the range of search for the first candidate decision processing.

4. The apparatus according to claim 1, wherein said correction unit comprises:
   a generation unit configured to generate vector data by coupling coordinate data of the position candidates of the plurality of feature points;

a subtracter configured to subtract an average vector, which is calculated in advance, from the vector data generated by said generation unit;

a projection unit configured to project, using eigenvectors which are calculated in advance, the vector data subtracted by said subtracter onto a subspace having the same dimensions as the eigenvector;

a back projection unit configured to back-project the vector data projected by said projection unit using the eigenvectors; and an adder configured to add the average vector to the vector data back-projected by said back projection unit, and to output the result as corrected positions of the feature points.

5. The apparatus according to claim 4, wherein the average vector and the eigenvectors are generated by learning using position coordinate data of all feature points required according to the operation mode.

6. The apparatus according to claim 4, wherein said second candidate decision unit decides elements corresponding to the average vector as the position candidates of the feature points.

7. The apparatus according to claim 1, further comprising a state determination unit configured to determine a state of the predetermined pattern in the image data, wherein the mode determination unit determines an operation mode according to a determination result of said state determination unit.

8. An image recognition apparatus for recognizing the predetermined pattern in the image data based on the positions of the plurality of feature points decided by a feature point positioning apparatus according to claim 1.

9. A processing method of a feature point positioning apparatus which positions a plurality of feature points for a predetermined pattern in image data, comprising the steps of:

selecting and controlling to execute one of a first candidate decision processing which decides position candidates of the feature points and a second candidate decision processing which decides position candidates of the feature points at a higher processing speed than the first candidate decision processing, for each of a plurality of feature points, in accordance with a determined operation mode, wherein the determined operation mode is selected from a plurality of operation modes including a normal mode and a high-speed mode in which an operation is executed at a higher speed than the normal mode, and wherein in the high-speed mode, there is selection and control to execute the second candidate decision processing for more feature points than in the normal mode; and correcting the position candidates of the plurality of feature points obtained by the first candidate decision processing or the second candidate decision processing based on a layout relationship among the plurality of feature points in any operation mode.

10. A non-transitory computer-readable storage medium storing a computer program for controlling a computer incorporated in a feature point positioning apparatus, which positions a plurality of feature points for a predetermined pattern in image data, to function as:

a first candidate decision unit configured to execute a first candidate decision processing to decide position candidates of the feature points;

a second candidate decision unit configured to execute a second candidate decision processing having a higher processing speed than the first candidate decision processing to decide position candidates of the feature points;

a mode determination unit configured to determine an operation mode which is selected from a plurality of operation modes including a normal mode and a high-speed mode in which an operation is executed at a higher speed than the normal mode;

a control unit configured to select and control to execute one of the first candidate decision processing and the second candidate decision processing for each of a plurality of feature points in accordance with the operation mode determined by the mode determination unit, and wherein in the high-speed mode, there is selection and control to execute the second candidate decision processing for more feature points than in the normal mode; and a correction unit configured to correct the position candidates of the plurality of feature points obtained by the first candidate decision processing or the second candidate decision processing based on a layout relationship among the plurality of feature points in any operation mode.

* * * * *